Patented Jan. 11, 1949

2,458,680

UNITED STATES PATENT OFFICE 2,458,680

TREATMENT OF OIL-BEARING VEGETABLE MEALS

Loran O. Buxton, Maplewood, N. J., assignor to Nopco Chemical Company, a corporation of New Jersey No Drawing. Application June 3, 1946, Serial No. 674,031

20 Claims. (Cl. 99—11)

The present invention relates to a process for rendering the exterior surfaces of oil-bearing vegetable meals nonoily or nonunctuous in character, and the product thereof.

Vegetable meals are customarily prepared by grinding a vegetable material to produce a comminuted substance. Although the oil content of various types of vegetable matter ranges from less than 10% to over 40%, the exterior of the individual particles of most of these meals is of unctuous character when the original oil content is present regardless of the proportion of that oil. That is, the meal appears oily to the eye, feels greasy when handled and readily tends to form cakes or lumps.

Although vegetable meals are used in considerable quantities in poultry and livestock feeds, they have generally been employed in the form of pressed meals from which the main portion of the oil has been removed by a hydraulic press, in an expeller or with a solvent such as hexane. While the oils themselves possess substantial value, one reason for extracting the oil from these meals was to reduce the unctuousness of the meals to the extent where they might be readily mixed in the dry condition with the other ingredients of poultry and livestock feeds. In many cases in the feeding of poultry and livestock, and for many other purposes, it is desirable to retain all of the naturally-occurring oils in the ground meal while at the same time having a free-flowing meal which is dry rather than oily or unctuous to the senses of sight and touch. Among the means suggested to reduce the oiliness of the surfaces of meals in the manufacture of vitamin-enriched dry products is a treatment of an oily meal with highly polar solvents, such as methanol, ethanol or an isopropanol-water mixture, as set forth in the copending application of Buxton and Konen, Serial No. 442,079, filed May 7, 1942, now Patent No. 2,401,293. However, this process is concerned only with the reduction in oiliness of substances having an oil content in the neighborhood of less than 30%. In addition, the treatment mentioned does not form new antioxidant substances nor make those in the meal more readily available. Other related copending applications are Serial Nos. 528,355, now Patent No. 2,426,486, and 528,356, now abandoned, filed March 27, 1944, by Buxton and Dryden, and Serial No. 674,030, filed concurrently herewith by Buxton.

An object of the invention is the reduction or elimination of the unctuous or oily appearance of vegetable meals.

A second object of the invention is the preparation of free-flowing vegetable meals containing all of their original naturally-occurring oils.

A third object of the invention is to enhance the resistance to oxidation of vegetable meals containing oils.

Other objects of the invention will in part be obvious and will in part appear hereinafter.

The present invention concerns the treatment of oil-bearing vegetable meals with a mixture of ammonia and a solvent miscible with the oil in the meal. The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

While the present process is primarily intended for reducing the unctuousness of vegetable meals containing all of their original oils and fats, it may also be used in the treatment of meals from which some or considerable quantities of the naturally-occurring oils have been removed, so long as the percentage of oleaginous material does not exceed about 50% of the total weight. Where the oil content is greater than 50%, the improved process will greatly reduce the surface oiliness and the tendency of the material to cake, but the resulting product cannot be said to be free-flowing and nonunctuous in appearance.

In carrying out the process, the oil-bearing meal is thoroughly impregnated with ammonia and a suitable organic solvent by mixing these substances together, preferably at an elevated temperature. After the ammonia and solvent have completely penetrated the interior of the individual particles of meal, the ammonia and solvent are separated from the meal in such manner that no substantial amount of oil leaves the meal with them. This operation can be most economically effected by simply air-drying the treated meal, but vacuum-drying may also be employed. If desired, the meal may be heated, but care should be exercised in selecting the drying temperature in order to avoid oxidizing some of the constituents of the meal. While satisfactory results could probably be obtained by drying at temperatures around 100° C., it is preferable to keep the temperature below 60° C. The recovery of solvents is best accomplished by the use of a solvent-recovery system; however, this is optional and may not in all cases be economical in view of the comparatively small quantity of solvent employed.

This treatment not only produces a dry, free-flowing meal of nonunctuous exterior surfaces but also enhances the oxidation-resistance of the substance. The ammonia and solvent appear to greatly increase the permeability of the cellular structure of the meal to fatty substances and also to serve as a vehicle for carrying the surface oil into the interior of the cells. Moreover, while vegetable meals usually contain antioxidant substances, treatment with a mixture of ammonia and certain organic solvents either forms new antioxidants in situ or increases the availability of the antioxidants already present. The chemical or physical action of the ammonia-solvent mixture is not completely understood at this time; hence, it is to be noted that the present invention is bound to no particular theory concerning the treatment set forth herein.

No especial type of equipment is necessary in carrying out the improved process as any device capable of thoroughly mixing a mass having the consistency of wet mush is suitable. Satisfactory results have been secured with a small laboratory mixer provided with two sets of revolving kneading blades. Means for heating the mass and a condenser to reduce or eliminate the escape of the solvent and ammonia during the mixing step in the treatment are desirable but not essential. While it is preferable from a standpoint of simplicity to conduct this operation at atmospheric pressure, it may be performed under elevated pressures in an autoclave or similar vessel. Neither the time nor the temperature of the treatment is critical, but sufficient time should be allowed for the mixture of solvent and ammonia to penetrate to all parts of all cells in the vegetable matter to procure the best results. Heating expedites this impregnation, but the treatment is operative at room temperature and lower. Temperatures above the boiling point of the solvent and above about 100° C. are undesirable as the ammonia and solvent will be driven out of the meal, and many vegetable substances deteriorate rapidly upon exposure to temperatures around 100° C. Mixing for about one hour at about 50° or 60° C. is usually best.

Any vegetable matter which has been ground to a meal and contains oleaginous substances may be utilized in the present invention where it is desired to have a solid carrier for fats and oils that is dry, free-flowing and has a non-oily exterior. Where the product is to be used as a feed for poultry, livestock or human beings, the meal should be selected from the cereal grains or other sources containing no constituents harmful to animal life, and substantial proportions of certain oleaginous and other substances, such as proteins, starches, sugars, etc., which possess a considerable nutritive value. Suitable meals include, inter alia, those obtained from cottonseed, maize, flaxseed, sesame seed, soya beans, peanuts, copra, cocoa beans, wheat germ, corn germ, barley, oats, rye, wheat, alfalfa, rice bran, palm kernels, dried grass and all types of edible nuts. The fineness of the meal is a matter of choice for the process is operative on very coarsely comminuted materials as well as those which have been reduced to the finest powder obtainable. Naturally, the larger particles will require a somewhat longer treatment to insure complete impregnation with the solvent-ammonia mixture, and very fine meals can be obtained only by a considerable expenditure of power. As a generalization, the employment of meals which will pass through a screen ranging from 40 mesh to 100 mesh is recommended.

The ammonia may be applied to the meal in any form, that is, as ammonia gas, liquified ammonia or as a solution of ammonia in water or any other suitable solvent. Accordingly, it is to be understood that the term "ammonia" is used herein throughout the specification and claims in the generic sense to denote ammonia gas ($NH_3$), liquid ammonia, and ammonia dissolved in water or any other suitable solvent. If gaseous ammonia is utilized in the treatment, suitable pressure vessels will be necessary to prevent high losses of ammonia and unbearable working conditions. If liquid anhydrous ammonia is employed, it will be necessary to provide refrigerating means for maintaining the mixer and meal at a low temperature. The preferred and most convenient manner of contacting the meal with ammonia is in the form of concentrated ammonium hydroxide solution containing approximately 28% $NH_3$ by weight. The quantity of active $NH_3$ used in the present process may vary widely, and although scientific methods may be available in the future for determining the exact quantity of ammonia for a unit weight of each species of vegetable meal, suitable amounts can be ascertained at the present time only by experimentation. It has been discovered in experiments with a wide variety of vegetable meals that the attributes of the products of this invention may be realized in at least some degree when 1000 parts by weight of vegetable meal is treated with from 1 to 100 parts by weight of $NH_3$, corresponding to 3 to 350 parts of concentrated ammonium hydroxide. However, better results may be obtained at lower cost by impregnating 1000 parts of meal with a mixture of an organic solvent and ammonia containing from 5 to 25 parts $NH_3$, corresponding to 18 to 88 parts of concentrated ammonium hydroxide; and the preferred proportions are in the range of 10 to 20 parts $NH_3$ or 35 to 70 parts by weight of concentrated ammonium hydroxide, for each 1000 parts of meal.

Appropriate organic solvents comprise those which are either miscible with or dissolve the major portion, and preferably all, of the oil and fatty constituents of the meal to be treated; further, the solvent must be compatible with ammonia, that is, not react with ammonia. In view of the large number of these constituents in vegetable matter, it is not surprising that a variety of solvents from a number of different chemical categories are suitable for the purpose. The solvent may consist of a single chemical compound or a mixture of several compounds. Solvents suitable for the instant method include, inter alia, hexane, heptane, octane, ethylene, dichloride, trichlorethylene, carbon tetrachloride, cyclohexane, methyl cyclohexane, benzene, acetone, isopropanol, diacetone alcohol, and the like. It is to be understood that the performance of these solvents is by no means identical. In the investigations carried out so far, acetone has proven highly superior to the other compounds listed for the present purposes.

A solvent mixture may be made up entirely of substances which are each suitable for use alone in this process, or it may include one or more ingredients which are immiscible with or do not dissolve fatty materials; in the latter case, the proportions of such ingredients must be kept sufficiently low in order not to appreciably affect the miscibility or solvent power of the solvent mixture in respect to fatty materials. Examples of the ingredients mentioned include the lower alcohols as, for instance, methanol, ethanol, propanol, etc. The action of the alcohols is not understood, but their incorporation into the solvent in minor amounts appears to increase the effectiveness of the solvent mixture in the treatment of certain vegetable meals. It is to be noted that these alcohols are all highly polar, and this feature may have some bearing on their effect in the solvent mixture. While it is preferable to select a solvent of substantial volatility at room temperature to expedite the air-drying step, this is not essential as the solvent can be vaporized by heat with or without the use of reduced pressures. Under any circumstances the solvent must be one which can be volatilized either at atmospheric or reduced pressures at temperatures below those at which the particular meal begins to decompose, so that the solvent can be driven off without substantial loss of oils or fats from the meal.

The quantity of solvent used can be varied widely from a minimum of about 80 parts by weight up to almost unlimited amounts for treating each 1000 parts of vegetable meal. However, the employment of large proportions of solvent merely increases the cost of the processing and lengthens the time required for drying the meal. From 200 to 600 parts of solvent with 1000 parts of meal produces an economical mixture of readily kneadable consistency. The preferred consistency of the mix is of the nature of wet mush which is plastic, rather than a slurry capable of being poured; the use of about 400 parts of solvent to 1000 parts of meal is recommended to obtain this consistency.

Treatment with a solvent alone will not achieve the results of the present invention. When a vegetable meal was mixed with the proper quantity of acetone alone in a heated mixer for an hour and then dried in air, the surface oiliness of the particles of treated meal was not noticeably different from the original meal.

For a fuller understanding of the nature and objects of the invention, reference should be had to the following examples which are given merely to further illustrate the invention and are not to be construed in a limiting sense, all parts given being by weight.

*Example I*

A sample of whole flaxseed was ground to a fine powder by passing it through a Micro-pulverizer. The resulting finely-divided meal was found upon analysis to have an oil content of 40.4% by weight. This meal possessed an oily appearance and feel; it would not flow freely and caked badly upon standing.

1000 grams of the flaxseed meal were placed in a Read mixer equipped with a heating jacket and a condenser for vapors. While the mixer was in operation, 400 grams (505 ml.) of acetone and 45 grams (50 ml.) of concentrated ammonium hydroxide (containing 28% NH₃ by weight) were added. The mixing was continued for one hour. Water at 50° to 60° C. was passed through the heating jacket during the mixing period. The resulting mass was air-dried to free it of acetone and ammonia, and then passed through a 10 mesh screen to break up the small lumps present.

The treated product had an oil content of 40.4%, the same figure as the untreated meal, but was free-flowing and stable against oxidative changes; its exterior surfaces were non-unctuous in appearance and feel.

*Example II*

Finely ground whole wheat germ meal was passed through a 60 mesh screen. The meal contained its entire natural oil content, amounting to 12.5% by weight, and exhibited an oily surface and tendencies to caking. A 1000 gram batch of this meal was processed in exactly the same manner and with the same agents as outlined in Example I.

The product was dry and free-flowing and did not cake or form lumps on long standing. It displayed no surface oiliness and was not greasy to the touch.

To compare the stabilities of the treated and untreated meals, samples of each were placed in covered petri dishes in an oven maintained at 37.5° C. After one month the untreated ground wheat germ meal was emitting an odor indicative of oxidation, while the treated material was still fresh and unchanged at this time, as well as a month later, under the same conditions.

*Example III*

Whole black soybeans were ground to a fine powder in a Micro-pulverizer. The resulting meal contained 17.9% oil by weight, and its surface was unctuous in appearance and feel. Individual particles tended to agglomerate; hence, the meal was not free-flowing in character.

1000 grams of the meal were treated with a mixture of 320 grams (404 ml.) of acetone, 80 grams (101 ml.) of methanol and 68 grams (75 ml.) of concentrated 28% aqueous ammonia exactly as described in Example I.

The treated meal was found to be dry, powdery, free-flowing and stable against oxidative changes. Although its oil content was unchanged, it exhibited no surface oiliness.

Since certain changes in carrying out the above process and certain modifications in the product which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which, as a matter of language, might be said to fall therebetween, and that they are intended to be inclusive in scope and not exclusive in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. A process for preparing a free-flowing, stabilized, oil-bearing vegetable meal which comprises thoroughly impregnating a vegetable meal containing a substantial amount, but not over 50% by weight, of oleaginous matter and having unctuous exterior surfaces on the individual particles of the meal with a compatible mixture of ammonia and a solvent miscible with said oleaginous matter, and removing the ammonia and said solvent from the meal in such manner that substantially all of said oleaginous matter remains with the meal.

2. A process for preparing a free-flowing oxidation-resistant, oil-bearing vegetable meal which comprises thoroughly impregnating 1000 parts by weight of a vegetable meal containing a substantial amount, but not over 500 parts by weight, of oleaginous matter and having unctuous exterior surfaces, by mixing therewith a compatible mixture of from 1 to 100 parts by weight of NH₃ and at least 80 parts by weight of an organic solvent miscible with said oleaginous matter, and removing the ammonia and said solvent from the meal in such manner that substantially all of said oleaginous matter remains with the meal.

3. A process for preparing a finely-divided, free-flowing, stabilized, oil-bearing vegetable meal which comprises thoroughly impregnating 1000 parts by weight of a ground vegetable meal containing a substantial amount, but not over 500 parts by weight, of oleaginous matter and having unctuous coatings on the exterior of the individual particles of meal by mixing therewith a compatible mixture of about 5 to 25 parts by weight of NH₃ and at least about 80 parts by weight of a volatile organic solvent miscible with said oleaginous matter, and removing the ammonia and said solvent from the meal in such manner that substantially all of said oleaginous matter remains with the meal.

4. A process for preparing a finely-divided, free-flowing, stabilized, oil-bearing vegetable meal which comprises thoroughly impregnating 1000 parts by weight of a ground vegetable meal containing a substantial amount, but not over 500 parts by weight, of oleaginous matter and having unctuous coatings on the exterior of the individual particles of meal by mixing therewith a compatible mixture of about 5 to 25 parts by weight of NH₃ in concentrated aqueous solution and at least about 80 parts by weight of a volatile organic solvent miscible with said oleaginous matter and removing the ammonia and said solvent from the meal by evaporation whereby the treated meal is less easily oxidized and comprises free-flowing particles with substantially their original content of oleaginous matter but with substantially nonunctuous exterior surfaces.

5. The process of claim 4 wherein the oil-bearing vegetable meal comprises flaxseed meal.

6. The process of claim 4 wherein the oil-bearing vegetable meal comprises wheat germ meal.

7. The process of claim 4 wherein the oil-bearing vegetable meal comprises soybean meal.

8. The process of claim 4 wherein said solvent comprises acetone.

9. The process of claim 4 wherein said solvent comprises a mixture of acetone and methanol.

10. A process for preparing a finely-divided, stabilized, free-flowing, oil bearing vegetable meal which comprises thoroughly impregnating 1000 parts by weight of a ground vegetable meal containing a substantial amount, but not over 500 parts by weight, of oleaginous matter and having unctuous coatings on the exterior of the individual particles of meal with about 10 to 20 parts by weight of NH₃ in concentrated aqueous solution and at least about 80 parts by weight of a volatile organic solvent miscible with said oleaginous matter and nonreactive with ammonia, the impregnation being accomplished by mixing the meal and liquids while heating to a temperature below both 100° C. and the boiling point of said solvent, and removing the ammonia and said solvent from the meal by evaporation whereby the treated meal is less easily oxidized and comprises free-flowing particles with substantially their original content of oleaginous matter but with substantially nonunctuous exterior surfaces.

11. A process for preparing a finely-divided, free-flowing, stabilized, oil-bearing vegetable meal which comprises thoroughly impregnating 1000 parts by weight of a ground vegetable meal containing a substantial amount, but not over 500 parts by weight of oleaginous matter, and having unctuous coatings on the exterior of the individual particles of meal by mixing therewith a compatible mixture of about 5 to 25 parts by weight of NH₃ in concentrated aqueous solution and at least about 80 parts by weight of a volatile organic solvent miscible with said oleaginous matter, and removing the ammonia and said solvent from the meal by air-drying whereby the treated meal is less easily oxidized and comprises free-flowing particles with substantially their original content of oleaginous matter but with substantially nonunctuous exterior surfaces.

12. A composition of matter prepared by the method set forth in claim 4.

13. A composition of matter which comprises flaxseed meal treated by the method set forth in claim 4.

14. A composition of matter which comprises wheat germ meal treated by the method set forth in claim 4.

15. A composition of matter which comprises soybean meal treated by the method set forth in claim 4.

16. A composition of matter which comprises a fat solvent-ammonia-treated oil-bearing, finely-divided, vegetable meal containing a substantial amount, but not over 50% by weight, of oleaginous matter, and the exterior surfaces of individual particles of the meal being substantially nonunctuous, whereby the meal is of substantially free-flowing character and more resistant to oxidation.

17. The composition of claim 16 in which the vegetable meal comprises flaxseed meal.

18. The composition of claim 16 in which the vegetable meal comprises wheat germ meal.

19. The composition of claim 16 in which the vegetable meal comprises soybean meal.

20. A composition of matter which comprises an acetone-ammonia-treated, oil-bearing, finely-divided, edible vegetable meal having substantially its entire naturally-occurring content of oleaginous matter in the interior of individual particles of meal, said oleaginous matter being present in a substantial amount, but not over 50% of the weight of the meal, and the exterior surface of individual particles being substantially nonunctuous, whereby the meal is of substantially free-flowing character and more resistant to oxidation.

LORAN O. BUXTON.

REFERENCES CITED

The following references are of record in the file of this patent:

UNITED STATES PATENTS

| Number | Name | Date |
|---|---|---|
| 1,850,095 | Dengler | Mar. 22, 1932 |
| 2,345,571 | Briod et el. | Apr. 4, 1944 |